US011136037B2

(12) United States Patent
Saikyo et al.

(10) Patent No.: US 11,136,037 B2
(45) Date of Patent: Oct. 5, 2021

(54) VEHICLE CONTROL DEVICE AND VEHICLE CONTROL METHOD

(71) Applicant: HONDA MOTOR CO., LTD., Tokyo (JP)

(72) Inventors: Marina Saikyo, Wako (JP); Hiroshi Miura, Wako (JP); Toshifumi Suzuki, Wako (JP); Suguru Yanagihara, Wako (JP); Yuta Takada, Tokyo (JP); Shogo Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 337 days.

(21) Appl. No.: 16/281,756

(22) Filed: Feb. 21, 2019

(65) Prior Publication Data

US 2019/0263412 A1 Aug. 29, 2019

(30) Foreign Application Priority Data

Feb. 23, 2018 (JP) .............................. JP2018-030365

(51) Int. Cl.
*B60W 30/18* (2012.01)
*B60Q 9/00* (2006.01)
*G06K 9/00* (2006.01)
*G05D 1/02* (2020.01)

(52) U.S. Cl.
CPC ......... *B60W 30/18163* (2013.01); *B60Q 9/00* (2013.01); *G06K 9/00798* (2013.01); *B60W 2554/00* (2020.02); *G05D 1/0212* (2013.01); *G05D 1/0231* (2013.01); *G05D 1/0257* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 9,672,734 B1 * | 6/2017 | Ratnasingam | ....... G08G 1/0968 |
| 2010/0070164 A1 | 3/2010 | Machino | |
| 2010/0274473 A1 * | 10/2010 | Konishi | ............. G01C 21/3697 701/532 |
| 2016/0264147 A1 * | 9/2016 | Mueller | ............ B60W 50/0098 |
| 2019/0061765 A1 * | 2/2019 | Marden | ........... B60W 30/18163 |

FOREIGN PATENT DOCUMENTS

JP 4879346 B2 2/2012

* cited by examiner

*Primary Examiner* — Jonathan M Dager
*Assistant Examiner* — Garrett F Evans
(74) *Attorney, Agent, or Firm* — Carrier Blackman & Associates, P.C.; Joseph P. Carrier; Jeffrey T. Gedeon (57) ABSTRACT

In a vehicle control device and a vehicle control method, the vehicle control device comprises a lane recognition unit adapted to recognize a lane type of an adjacent lane adjacent to a host vehicle lane in which a host vehicle is traveling, a determination condition setting unit adapted to set a determination condition for permitting a lane change of the host vehicle from the host vehicle lane to the adjacent lane depending on the lane type of the adjacent lane that was recognized by the lane recognition unit, a lane change determining unit adapted to permit the lane change in the case that the determination condition is satisfied, and a vehicle control unit adapted to carry out a travel control or an assist control in relation to the lane change, in the case that the lane change determining unit has permitted the lane change.

12 Claims, 6 Drawing Sheets

VEHICLE CONTROL DEVICE AND VEHICLE CONTROL METHOD

CROSS-REFERENCE TO RELATED APPLICATION

This application is based upon and claims the benefit of priority from Japanese Patent Application No. 2018-030365 filed on Feb. 23, 2018, the contents of which are incorporated herein by reference.

BACKGROUND OF THE INVENTION

Field of the Invention

The present invention relates to a vehicle control device and a vehicle control method, which are adapted to carry out a travel control or an assist control for a host vehicle, on the basis of an output result from at least one device from among a periphery monitoring device that monitors the periphery around the host vehicle, or a position specifying device that specifies a travel position of the host vehicle.

Description of the Related Art

In the United States, in order to alleviate traffic congestion on a freeway connecting urban and suburban regions, locations exist where a single lane or a plurality of lanes on a left side with respect to the direction of travel are set as car pool lanes in which only vehicles that satisfy specified conditions are capable of traveling. In such car pool lanes, emergency vehicles and motorcycles are capable of traveling unconditionally, whereas four-wheeled vehicles are allowed to travel therein if two or three or more people are riding as passengers in the vehicle. In addition, as a part of environmental countermeasures, if a so-called eco car (ecologically friendly car) meets certain criteria, even a four-wheeled vehicle in which a single passenger is riding is capable of traveling in such a car pool lane.

In Japanese Patent No. 4879346, it is disclosed that when an automobile comes into proximity to a car pool lane, visible information such as letters, markings, or an enlarged map or the like which indicate the car pool lane is displayed on a display screen of a navigation device.

SUMMARY OF THE INVENTION

Incidentally, in recent years, an automated driving technique (AD) or a driving assist technique (ADAS, advance driving assistant system), which at least partially carries out a travel control of a host vehicle automatically, is being rapidly developed. For this reason, in the future, cases are also assumed in which such vehicles will be capable of traveling on a freeway.

However, in the technique of the above-described publication, the object thereof is to cause a driver of the host vehicle to recognize appropriate information concerning a car pool lane. Therefore, upon entering and using such a car pool lane, no consideration is given as to how to enable the host vehicle to smoothly execute automated traveling.

For example, in a road having a plurality of lanes such as a freeway, when there is a specified lane such as a car pool lane as well as general lanes in which all vehicles are capable of traveling, the tendency of the flow of traffic (for example, the traffic volume, the traffic density, the traffic velocity) differs from each other. In this case, between a host vehicle lane in which the host vehicle is currently traveling and an adjacent lane adjacent to the host vehicle lane, no consideration is given in the above-described publication concerning how to enable the host vehicle to change lanes smoothly from the host vehicle lane to the adjacent lane. In addition, not only in the case of making a lane change between different lane types, in the above-describe publication, there is also no consideration given concerning a lane change of the host vehicle between the same lane types.

The present invention has been devised in order to solve the aforementioned problems, and has the object of providing a vehicle control device which is capable of smoothly performing a lane change while taking into consideration a tendency of the flow of traffic.

The present invention concerns a vehicle control device and a vehicle control method, which are adapted to carry out a travel control or an assist control for a host vehicle, on the basis of an output result from at least one device from among a periphery monitoring device that monitors the periphery around the host vehicle, or a position specifying device that specifies a travel position of the host vehicle.

In this case, the vehicle control device comprises a lane recognition unit adapted to recognize a lane type of an adjacent lane adjacent to a host vehicle lane in which a host vehicle is traveling, a determination condition setting unit adapted to set a determination condition for permitting a lane change of the host vehicle from the host vehicle lane to the adjacent lane depending on the lane type of the adjacent lane that was recognized by the lane recognition unit, a lane change determining unit adapted to permit the lane change in the case that the determination condition is satisfied, and a vehicle control unit adapted to carry out a travel control or an assist control in relation to the lane change, in the case that the lane change determining unit has permitted the lane change.

Further, the vehicle control method comprises a first step in which a lane recognition unit recognizes a lane type of an adjacent lane adjacent to a host vehicle lane in which a host vehicle is traveling, a second step in which a determination condition setting unit sets a determination condition for permitting a lane change of the host vehicle from the host vehicle lane to the adjacent lane depending on the lane type of the adjacent lane that was recognized by the lane recognition unit, a third step in which a lane change determining unit permits the lane change in the case that the determination condition is satisfied, and a fourth step in which a vehicle control unit carries out a travel control or an assist control in relation to the lane change, in the case that the lane change determining unit has permitted the lane change.

In the foregoing manner, even if there is a tendency for the flow of traffic to differ in each of the lanes, the control condition for permitting the lane change is changed depending on the lane type. Consequently, it becomes possible to appropriately determine whether to permit the lane change while taking into consideration the tendency of the flow of traffic, and it is possible for the host vehicle to smoothly perform the lane change. As a result, even when the host vehicle travels on a road such as a freeway having a plurality of lanes, the host vehicle is capable of traveling in a stable manner.

Further, the lane type of the adjacent lane may include a specified lane in which a specified vehicle is capable of traveling in a preferential manner, or a general lane in which all vehicles can travel. The determination condition setting unit may set the determination condition in consideration of a state of the host vehicle, the periphery monitoring device, the position specifying device, or the vehicle control device, the surrounding environment of the host vehicle, information concerning the driver of the host vehicle, or travel plan information of the host vehicle, in a manner so that the determination condition differs between a case in which the adjacent lane is the specified lane and a case in which the adjacent lane is the general lane. In accordance with this feature, since the determination condition is set in accordance with the state (soundness) of the system related to automated driving and the state of the driver, it is possible to make the determination of permitting the lane change more accurately.

Furthermore, in the case that the adjacent lane is the specified lane, the determination condition setting unit may set the determination condition to be stricter than the determination condition when the adjacent lane is the general lane, based on a number of vehicle occupants of the host vehicle, a point in time when the lane change is made, or a type of the host vehicle. In accordance with this feature, the lane change from the general lane to the specified lane such as the car pool lane can be permitted only with respect to the specified vehicle. As a result, it becomes possible to more accurately determine whether to permit the lane change.

In this instance, in the case that the adjacent lane is the specified lane, the lane change determining unit does not permit the lane change when a predetermined condition is satisfied. In this manner, by prohibiting or suppressing the lane change to the specified lane, it is possible to prevent the host vehicle from inadvertently making a lane change to the specified lane using AD or ADAS.

In greater detail, the lane change determining unit does not permit the lane change if the following various conditions are satisfied.

More specifically, in the case that the host vehicle lane is relatively empty, it is possible to travel comfortably in the host vehicle lane, and there is little necessity to make a lane change to the specified lane. In such a case, the lane change determining unit does not permit the lane change.

Further, if a lane change to the specified lane is performed in the case that the host vehicle is automatically traveling in the host vehicle lane in a state in which the host vehicle has not set a destination (hereinafter also referred to as traveling in a road following manner), time is required to make the lane change from the specified lane into the host vehicle lane and the adjacent lane, and there is also assumed to be a possibility that the host vehicle may not be able to depart from an exit of the road as desired by the driver. In such a case, the lane change determining unit does not permit the lane change.

Furthermore, in the case that a proficiency level of the driver with respect to the travel control or the assist control is less than a threshold value, and if the host vehicle is traveling in the specified lane using AD or ADAS, then when a lane change is made from the specified lane into the host vehicle lane and the adjacent lane, there is also assumed to be a possibility that the driver may have trouble in coping with such a lane change. In such a case, the lane change determining unit does not permit the lane change.

Still further, in the case that traffic congestion is occurring in the vicinity of an exit of the road including the host vehicle lane and the adjacent lane, and if the host vehicle is traveling in the specified lane, there is a possibility that the host vehicle may not be capable of departing from the exit. In such a case, the lane change determining unit does not permit the lane change.

Upon comparing a case of the host vehicle traveling in the host vehicle lane, and a case of the host vehicle making a lane change and traveling in the adjacent lane, when it is determined that the host vehicle traveling in the adjacent lane will reach a destination in a shorter time period, the lane change determining unit may notify the driver of the determination result through the notification device of the host vehicle. In accordance with this feature, it becomes possible for the driver to select whether to remain traveling in the host vehicle lane, or to perform a lane change into the adjacent lane.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Preferred embodiments of a vehicle control device and a vehicle control method according to the present invention will be presented and described in detail below with reference to the accompanying drawings.

[1. Configuration of Vehicle 12 Including the Vehicle Control Device 10]

<1.1. Outline of Vehicle 12>

Figure 1:
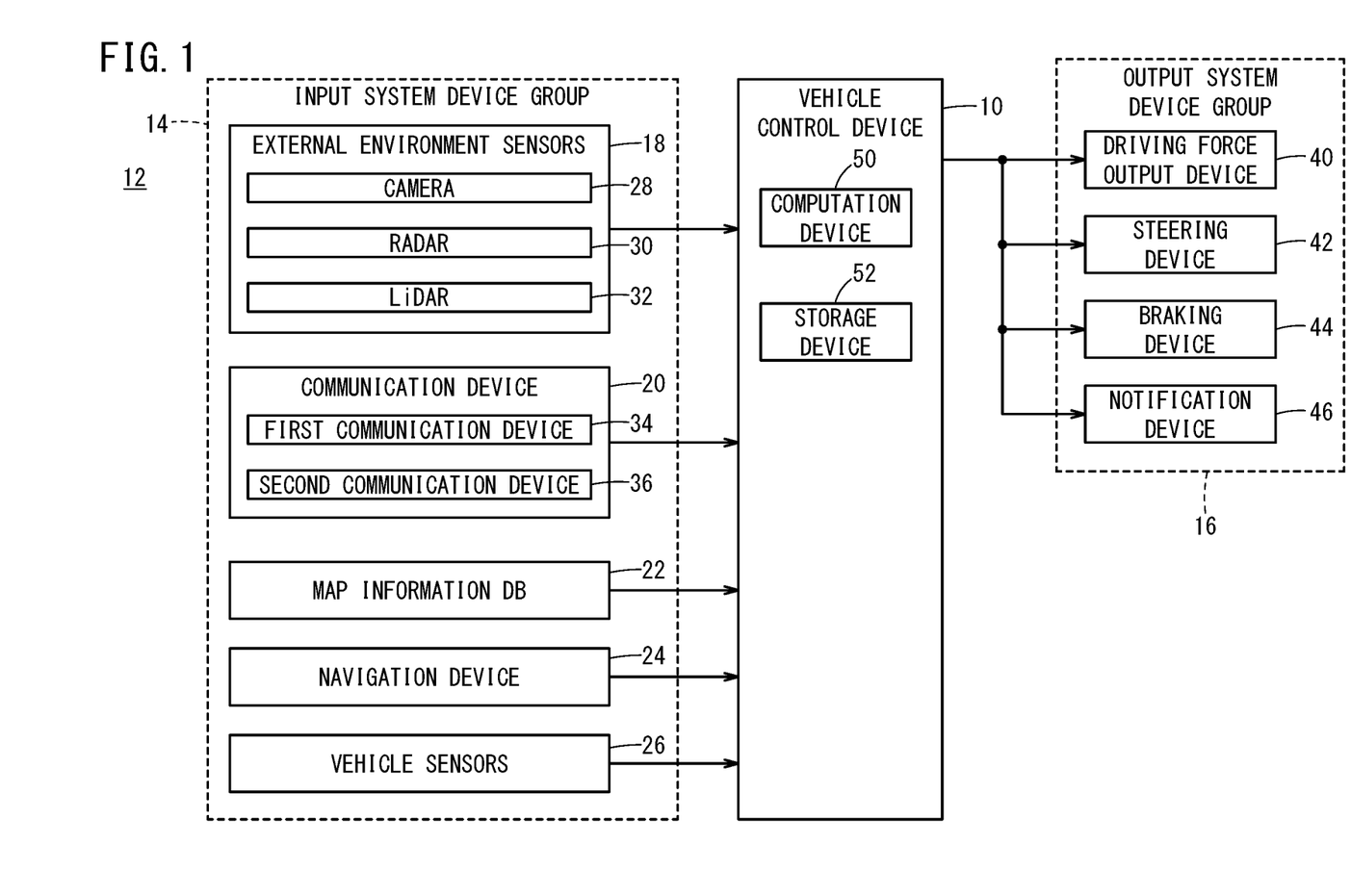
FIG. 1 is a block diagram showing the configuration of a host vehicle in which there is included a vehicle control device according to an embodiment of the present invention.

FIG. 1 is a block diagram showing the configuration of a vehicle 12 (hereinafter referred to as a host vehicle 12) in which there is included a vehicle control device 10 according to an embodiment of the present invention. The vehicle control device 10 is incorporated in the host vehicle (user's own vehicle) 12, and performs a driving control for the host vehicle 12 by way of automated driving or manual driving. Moreover, in the present specification, the term "automated driving" implies a concept that includes not only "fully automated driving" in which the travel control for the host vehicle 12 is performed entirely automatically, but also "partial automated driving" in which the travel control is partially performed automatically.

The host vehicle 12 includes the vehicle control device 10 that oversees the driving control of the host vehicle 12, an input system device group 14 responsible for input functions of the vehicle control device 10, and an output system device group 16 responsible for output functions of the vehicle control device 10.

<1.2. Specific Configuration of Input System Device Group 14>

In the input system device group 14, there are included external environment sensors 18 (periphery monitoring devices) that detect a state of the surrounding vicinity (external environment) around the periphery of the host vehicle 12, a communication device 20 (periphery monitoring device) which carries out transmission and reception of information to and from various communication devices located externally of the host vehicle 12, a high precision map database 22 (hereinafter also referred to as a map information DB (position specifying device) 22) which acquires map information indicative of a high precision map, a navigation device 24 (position specifying device) that generates a travel route to a destination together with measuring the position of the host vehicle 12, and vehicle sensors 26 that detect the state of the host vehicle 12.

Among the external environment sensors 18, there are included one or more cameras 28 for capturing images of the external environment, one or more radar devices 30 that detect the distance and the relative velocity between the host vehicle 12 and other objects (for example, other vehicles), and one or more LiDAR (Light Detection and Ranging/Laser Imaging Detection and Ranging) devices 32.

In the communication device 20, there are included a first communication device 34 that performs inter-vehicle communications between the host vehicle 12 and other vehicles, and a second communication device 36 that performs road-to-vehicle communications between the host vehicle 12 and roadside devices. The navigation device 24 includes a satellite navigation system and a self-contained navigation system. Among the vehicle sensors 26, there are included various sensors that detect behaviors of the host vehicle 12, such as a vehicle velocity sensor, an acceleration sensor, a yaw rate sensor, an inclination sensor, and the like, various sensors that detect the state of operation of the host vehicle 12, and various sensors that detect the state of the driver, such as a vehicle interior camera that captures images of the state of the driver of the host vehicle 12.

<1.3. Specific Configuration of Output System Device Group 16>

The output system device group 16 includes a driving force output device 40, a steering device 42, a braking device 44, and a notification device 46.

The driving force output device 40 includes a driving force ECU (Electronic Control Unit), and a drive source including an engine and/or a driving motor. The driving force output device 40 generates a driving force in accordance with an operation of an accelerator pedal performed by the driver, or a driving control instruction output from the vehicle control device 10.

The steering device 42 includes an EPS (electric power steering system) ECU, and an EPS actuator. The steering device 42 generates a steering force in accordance with an operation of the steering wheel performed by the driver, or a steering control instruction output from the vehicle control device 10.

The braking device 44 includes a brake ECU and a brake actuator. The braking device 44 generates a braking force in accordance with an operation of the brake pedal performed by the driver, or a braking control instruction output from the vehicle control device 10.

The notification device 46 includes a notification ECU, and an information transmission device (for example, a display device, an audio device, a haptic device). The notification device 46 issues a notification (for example, providing information through the five senses including the senses of seeing and hearing) with respect to the driver in accordance with a notification instruction output from the vehicle control device 10 or another ECU.

<1.4. Specific Configuration of Vehicle Control Device 10>

The vehicle control device 10 is constituted by one ECU or a plurality of ECUs, and comprises a computation device 50 such as a processor, and a storage device 52 such as a ROM (Read Only Memory) and a RAM (Random Access Memory). The vehicle control device 10 realizes various functions by the computation device 50 executing programs stored in the storage device 52.

Figure 2:
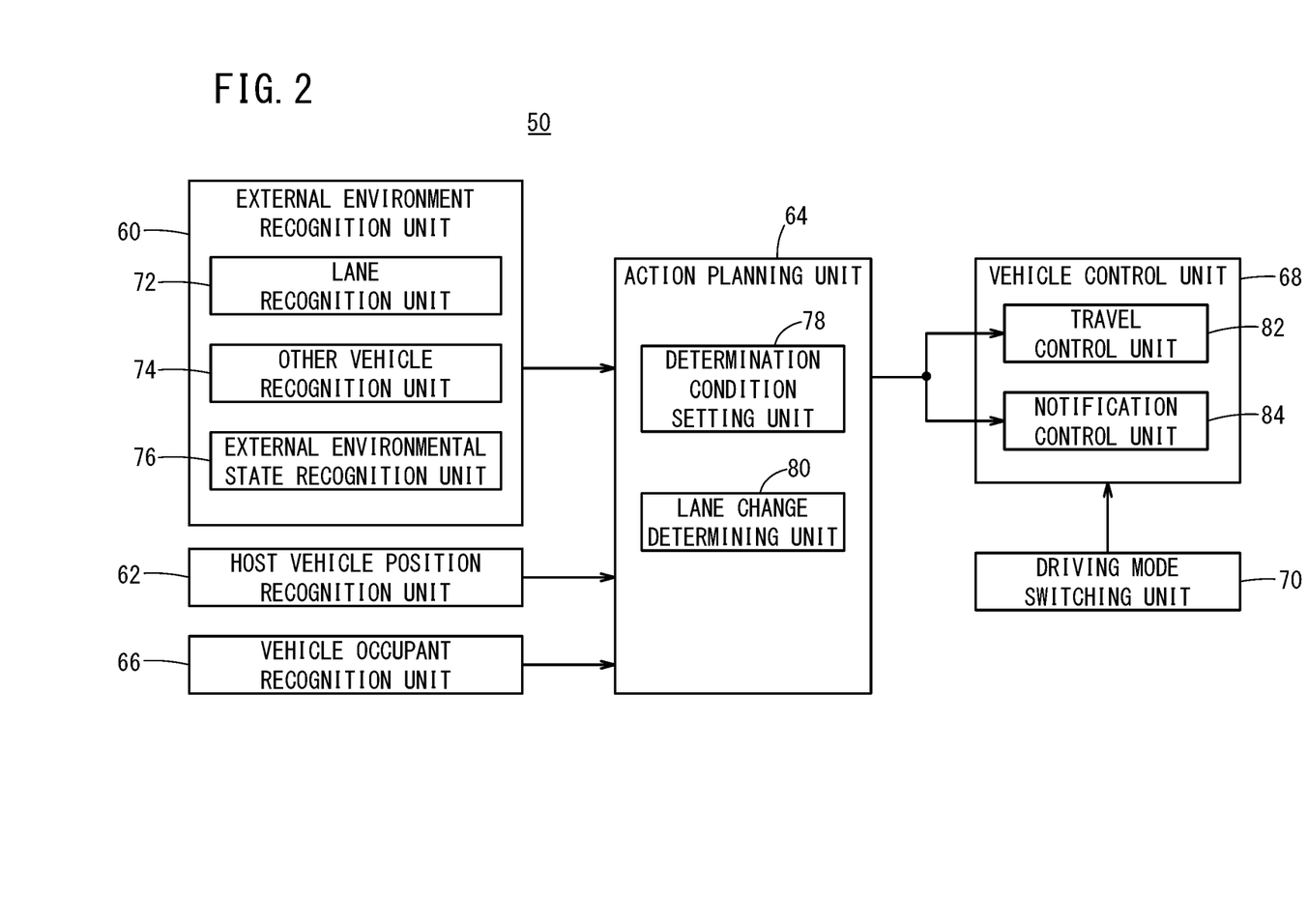
FIG. 2 is a functional block diagram of a computation device shown in FIG. 1.

FIG. 2 is a functional block diagram of the computation device 50 shown in FIG. 1. The computation device 50 is configured to be capable of executing various functions of an external environment recognition unit 60, a host vehicle position recognition unit 62, an action planning unit 64, a vehicle occupant recognition unit 66, a vehicle control unit 68, and a driving mode switching unit 70.

On the basis of information output from the external environment sensors 18, the external environment recognition unit 60 recognizes the circumstances and objects in the vicinity around the host vehicle 12. The external environment recognition unit 60 includes a lane recognition unit 72, an other vehicle recognition unit 74, and an external environmental state recognition unit 76.

Based on information output from the map information DB 22 and the navigation device 24, the host vehicle position recognition unit 62 recognizes the absolute position of the host vehicle 12, or the relative position (hereinafter also referred to as the host vehicle position) on the high precision map.

Based on the image information of the driver which is captured by the vehicle interior camera, which is one of the vehicle sensors 26, and information concerning the state of the driver output from various other sensors that make up the vehicle sensors 26, the vehicle occupant recognition unit 66 recognizes the state of the driver (for example, a level of wakefulness of the driver, and a proficiency level of the driver with respect to automated driving).

On the basis of the recognition results from the external environment recognition unit 60, the host vehicle position recognition unit 62, and the vehicle occupant recognition unit 66, the action planning unit 64 creates action plans (a time series of events for each of respective travel segments) according to the situation of the host vehicle 12 and the driver, and updates the action plans as needed. Further, on the basis of the aforementioned recognition results, the action planning unit 64 generates travel trajectories (a time series of target behaviors) in accordance with the created action plans. The action planning unit 64 includes a determination condition setting unit 78 and a lane change determining unit 80.

The vehicle control unit 68 issues instructions for desired operations with respect to the output system device group 16 (see FIG. 1), on the basis of the action plans or the travel trajectories created by the action planning unit 64. The vehicle control unit 68 includes a travel control unit 82 that carries out a travel control for the host vehicle 12, and a notification control unit 84 that performs a notification control with respect to the driver.

The driving mode switching unit 70 is configured to be capable of switching between a plurality of driving modes including an "automated driving mode" and a "manual driving mode," in accordance with predetermined actions taken by the driver (for example, operation of input devices including switches and the steering wheel). Hereinafter, a request action in order to cause the driver to transition from automated driving to manual driving may also be referred to as a "takeover request".

[2. Operations of Vehicle Control Device 10]

The host vehicle 12 including the vehicle control device 10 according to the present embodiment is configured basically in the manner described above. Next, operations (a vehicle control method) of the vehicle control device 10 at the time of making a lane change on a road including a plurality of lanes will be described primarily with reference to the flowchart of FIG. 3. In this instance, a case will be assumed in which the host vehicle 12, which is equipped with the vehicle control device 10 (see FIG. 1), travels by way of automated driving.

<2.1. Description of Road 100>

Figure 4:
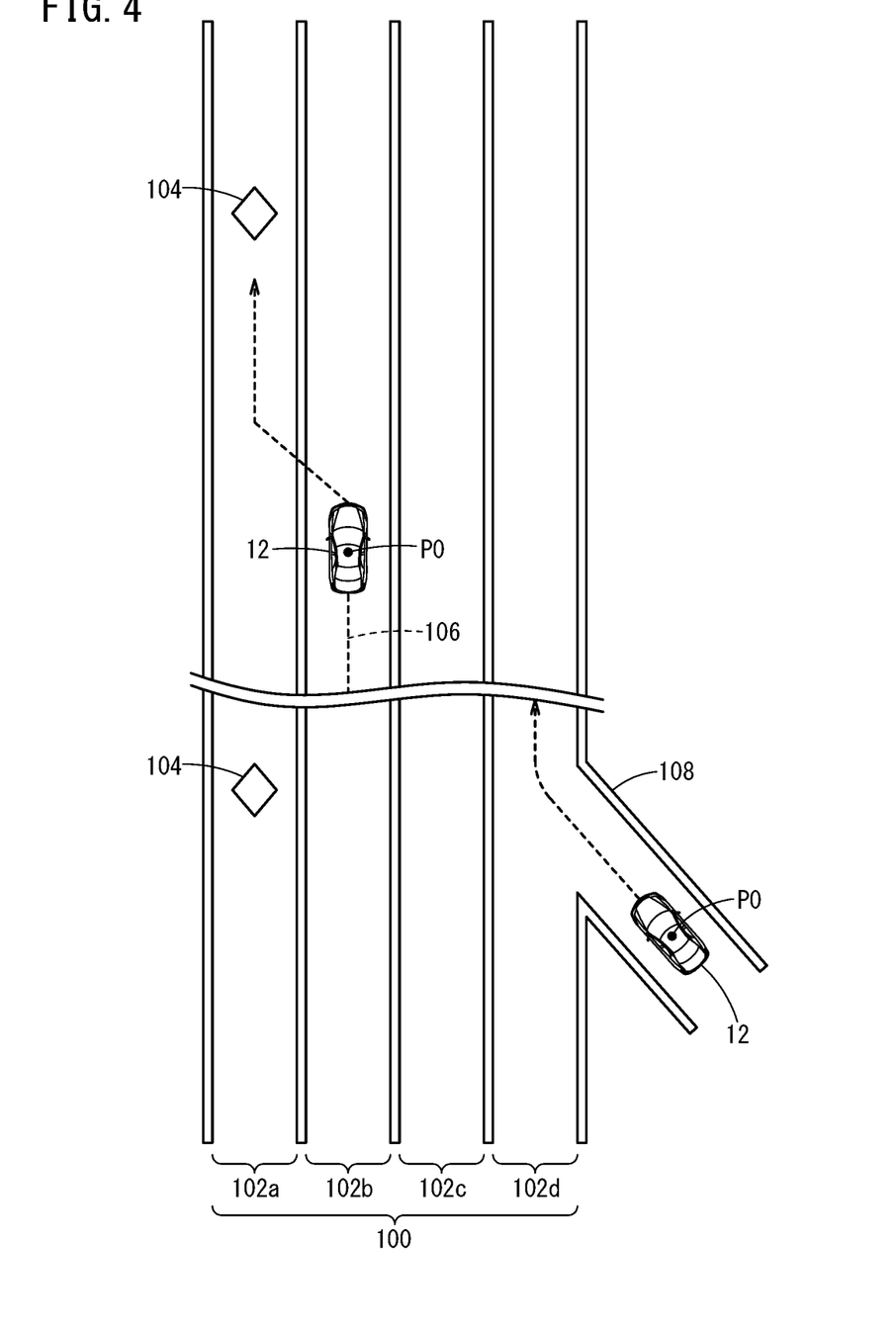
FIG. 4 is a diagram showing a lane change made on a freeway.

FIG. 4 is a diagram showing a travel scenario of the host vehicle 12 on a road 100 that includes a plurality of lanes. The road 100, for example, is a freeway in the United States. On the road 100, four lanes are provided along a travel direction of vehicles including the host vehicle 12. Among the four lanes, the leftmost lane in the travel direction is a car pool lane (specified lane) 102a, and the remaining three lanes are general lanes 102b to 102d. Rhombus shaped road markings 104 which indicate the existence of the car pool lane 102a are provided in the car pool lane 102a.

The car pool lane 102a is a specified lane in which specified vehicles such as an emergency vehicle, a two-wheeled vehicle, a four-wheeled vehicle in which two or three or more people are riding as passengers, or an eco car in which a single person is riding are capable of traveling in a preferential manner. Further, the general lanes 102b to 102d are lanes in which all vehicles are capable of traveling. It should be noted that the car pool lane 102a is made use of as a car pool lane only during a predetermined time period, and all vehicles are capable of traveling therein as a general lane at other time periods.

In this instance, a description will be given concerning a case in which the host vehicle 12 enters into a freeway from an entrance 108, and travels while changing lanes along a planned travel route 106 which is indicated by the dashed line on the freeway lanes (the respective lanes 102a to 102d of the road 100).

<2.2. Description of the Flowchart of FIG. 3>

Figure 3:
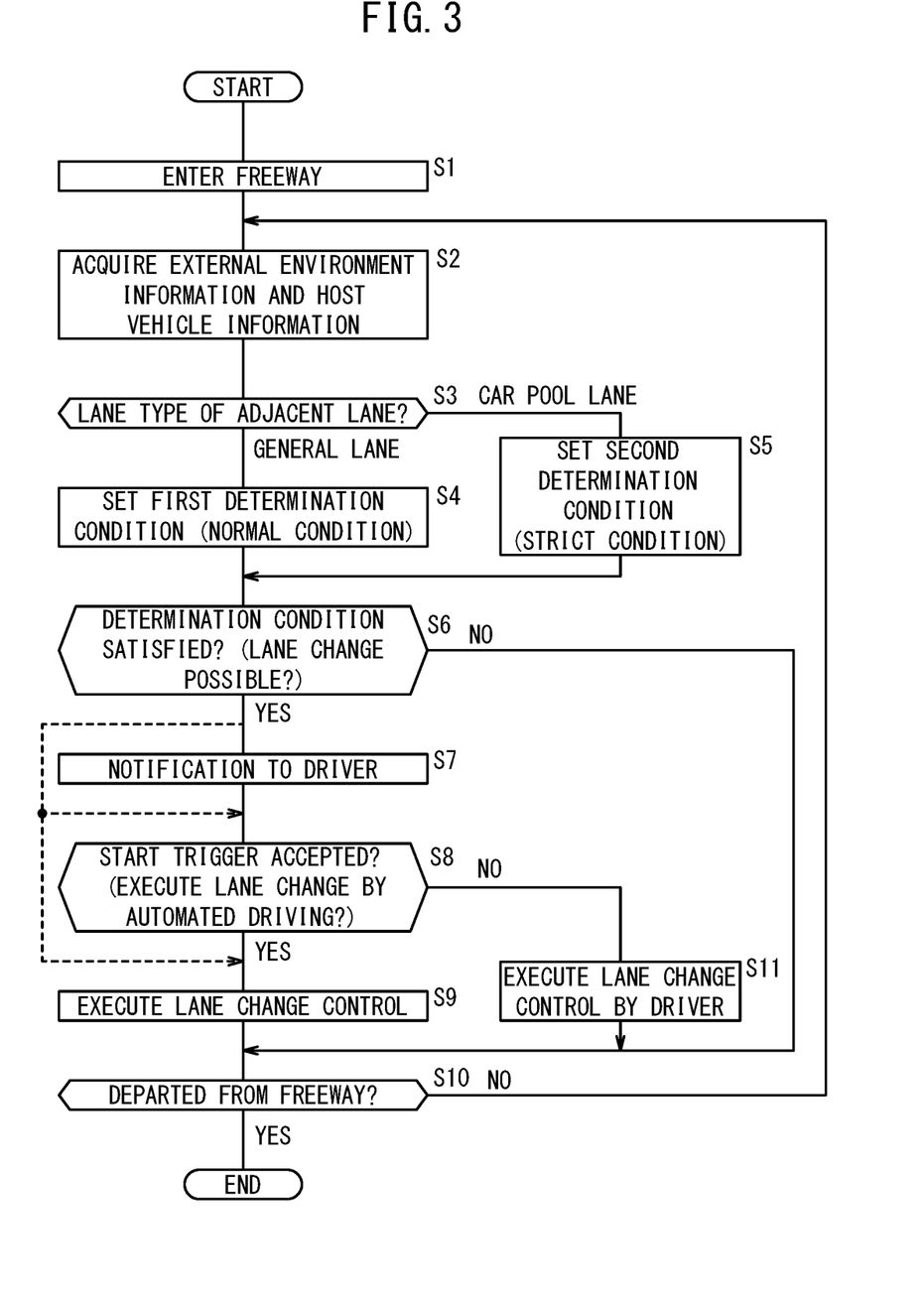
FIG. 3 is a flowchart for describing operations of the computation device shown in FIG. 2.

In step S1 of FIG. 3, the host vehicle 12 (see FIGS. 1 and 4) enters the freeway (the road 100) through the entrance 108.

In step S2 (first step), the vehicle control device 10 (see FIG. 1) acquires information of the external environment and information of the host vehicle 12 which are output from the input system device group 14. In this case, as the information acquired by the vehicle control device 10, there are included, for example, (1) information concerning the soundness of the automated driving system, that is, the states of the host vehicle 12, the input system device group 14, and the vehicle control device 10 in relation to the automated driving system, (2) the surrounding environment of the host vehicle 12, (3) information of the driver, (4) the host vehicle position P0 on the road 100 (see FIG. 4), (5) the number of lanes of the road 100, (6) the host vehicle lane L1 (see FIGS. 5 to 6) which is the lane in which the host vehicle 12 is traveling, and (7) travel plan information of the host vehicle 12, more specifically, the planned travel route 106 from the host vehicle position P0 to the exit of the road 100 at the destination, and the remaining distance from the host vehicle position P0 to the exit. The vehicle control device 10 may acquire all of such pieces of information, or may acquire only information that is necessary.

More specifically, the host vehicle position recognition unit 62 (see FIG. 2) acquires (recognizes) the host vehicle position P0 and the planned travel route 106 on the basis of the output information of the map information DB 22 and the navigation device 24. Further, the host vehicle position recognition unit 62 specifies the position of the exit on the basis of the output information of the map information DB 22. Consequently, on the basis of the specified position of the exit and the host vehicle position P0, the host vehicle position recognition unit 62 is capable of calculating the remaining distance.

For example, based on the image information from the cameras 28 or the map information (high-precision map) read out from the map information DB 22, the external environmental state recognition unit 76 recognizes information concerning the general road environment of the road 100, for example, the shape and width, the number of lanes, and the lane width of the road 100.

For example, on the basis of the image information of the cameras 28 or the map information from the map information DB 22, and the information of the road 100 acquired by the external environmental state recognition unit 76, the lane recognition unit 72 recognizes the lane types of each of the lanes 102a to 102d of the road 100 including the host vehicle lane L1 and the adjacent lane L2 adjacent to the host vehicle lane L1. Consequently, in the situation shown in FIG. 4, the lane recognition unit 72 is capable of recognizing that the host vehicle lane L1 is a general lane 102b and that the adjacent lane L2 is a car pool lane 102a, or alternatively, in the situation shown in FIG. 5, that the host vehicle lane L1 is a car pool lane 102a and that the adjacent lane L2 is a general lane 102b.

Further, in step S2, for example, based on the information output from the cameras 28, the radar devices 30, or the LiDAR devices 32, the other vehicle recognition unit 74 can recognize the presence or absence, the position, the size, and the types of the other vehicles (the other vehicles 110, 110f, 110r, etc., shown in FIGS. 5 and 6) which are traveling or stopped around the periphery of the host vehicle 12, and can also calculate the distance and the relative velocity between the host vehicle 12 and the other vehicles.

Furthermore, based on information output from the vehicle sensors 26 (image information of the driver captured by the vehicle interior camera, the state of the driver as detected by various sensors), the vehicle occupant recognition unit 66 recognizes a level of wakefulness of the driver, and a proficiency level of the driver with respect to automated driving.

Information concerning the soundness of the automated driving system (the state of the host vehicle 12, the input system device group 14, and the vehicle control device 10 in relation to the automated driving system), more specifically, is the remaining fuel of the host vehicle 12, and the sensitivity (degree of contamination of sensor detection surfaces) of the external environment sensors 18 and the vehicle sensors 26. For example, as for the information concerning the soundness thereof, for example, in the external environment recognition unit 60, the host vehicle position recognition unit 62, and the vehicle occupant recognition unit 66 to which output information of the external environment sensors 18 and the vehicle sensors 26 is input, a comparison is made between levels of the output information input thereto and a normal range or an ordinary range of the output information, whereby the soundness of the automated driving system can be recognized. Further, the proficiency level of the driver may include the frequency of use of the road 100 (freeway) and the number of uses of the car pool lane 102a at a time of manual driving.

In addition, in step S3 (first step), based on the recognition result of the lane recognition unit 72, the determination condition setting unit 78 confirms the lane type of the adjacent lane L2. Then, as shown in the following steps S4 and S5 (second step), depending on the lane type of the adjacent lane L2, the determination condition setting unit 78 sets the determination condition to be used in a determination process for permitting a lane change in step S6 (third step). The determination condition is a judgment criterion for determining whether or not to permit execution of a lane change of the host vehicle 12 from the host vehicle lane L1 to the adjacent lane L2.

As determination conditions, there are included, for example, (1) the remaining fuel of the host vehicle 12, (2) an availability or state of emptiness of the general lanes 102b to 102d, (3) information as to whether the host vehicle 12 is traveling in a road following manner, (4) a proficiency level of the driver with respect to automated driving, (5) a proficiency level with respect to automated driving of the host vehicle 12, (6) traffic congestion in the vicinity of an exit of the road 100, (7) weather information (e.g., rain, snow, temperature, wind) in the vicinity of the host vehicle 12, or a degree of direct sunlight such as during sunrise or sunset in particular with respect to the cameras 28 or the driver of the host vehicle 12, (8) a level of wakefulness or alertness of the driver, and (9) a remaining distance to the exit.

More specifically, in the case that the adjacent lane L2 is one of the general lanes 102b to 102d, the process proceeds to step S4. In step S4, the determination condition setting unit 78 sets a first determination condition. The first determination condition is a determination condition default value (normal condition) for permitting the lane change. In this case, the determination condition setting unit 78 sets the first determination condition in consideration of the information in relation to the soundness of the above-described automated driving system, the surrounding environment of the host vehicle 12, information of the driver, or the remaining distance or the like.

Further, in the case that the adjacent lane L2 is the car pool lane 102a, the process proceeds to step S5. In step S5, the determination condition setting unit 78 sets a second determination condition. The second determination condition is a determination condition that is stricter than the first determination condition. More specifically, in addition to the first determination condition, the determination condition setting unit 78 sets the second determination condition in which there is included the number of vehicle occupants of the host vehicle 12, a point in time when the lane change is made, or a type of the host vehicle 12.

More specifically, as discussed previously, the car pool lane 102a is a specified lane in which a specified vehicle such as an emergency vehicle or the like is capable of traveling in a preferential manner. Further, the car pool lane 102a is made use of as a car pool lane only during a predetermined time period. Accordingly, by setting the determination condition more strictly than the first determination condition, for example, as noted above, by setting the second determination condition by increasing the condition items more so than with the first determination condition, it is possible to prevent vehicles other than specified vehicles from making a lane change into the car pool lane 102a.

Further, within the second determination condition, the determination condition setting unit 78 can make the judgment criteria stricter in relation to the same condition items as those of the first determination condition. For example, the threshold value of the remaining fuel of the host vehicle 12 when the lane change is permitted may be set to a value that is larger than the threshold value used with the first determination condition.

More specifically, the car pool lane 102a is the lane that is most distant from the entrance 108 or the exit. Further, in the car pool lane 102a, the traffic volume is relatively small and the average velocity is relatively high, and therefore, the inter-vehicle distance tends to be relatively long. Therefore, if a lane change to the car pool lane 102a is performed in the case that the remaining fuel of the host vehicle 12 is small, or in the case that the host vehicle 12 is traveling in a road following manner in one of the general lanes 102b to 102d, time is required to make the lane change from the car pool lane 102a into the general lane 102b, and there is a possibility that the host vehicle 12 may not be able to depart from an exit of the road 100 as desired by the driver. Thus, by setting the second determination condition which is stricter than the first determination condition, the determination condition setting unit 78 is capable of preventing the lane change from being inadvertently permitted.

In this manner, different first determination conditions or second determination conditions are set by the determination condition setting unit 78 depending on the lane type of the adjacent lane L2. The first determination condition or the second determination condition that has been set is output to the lane change determining unit 80.

In step S6, the lane change determining unit 80 determines whether or not the host vehicle 12 satisfies the first determination condition or the second determination condition, and more specifically, whether or not it is possible to make the lane change from the host vehicle lane L1 into the adjacent lane L2.

More specifically, in the case of a lane change between the general lanes 102b to 102d, or a lane change from the car pool lane 102a into the general lane 102b, the lane change determining unit 80 determines whether or not the host vehicle 12 satisfies the first determination condition. For example, in the case that the remaining fuel is greater than or equal to a threshold value, in the case that the level of wakefulness of the driver is greater than or equal to a threshold value, or in the case that the proficiency level of the driver with respect to automated driving is greater than or equal to a threshold value indicated by the first determination condition, the lane change determining unit 80 determines that the lane change is possible (step S6: YES), and the process proceeds to the following step S7. On the other hand, in the case that the first determination condition is not satisfied (step S6: NO), the lane change determining unit 80 does not permit the lane change, skips the processes of steps S7 to S9, and the process proceeds to step S10.

Further, in the case of a lane change from the general lanes 102b (host vehicle lane L1) into the car pool lane 102a (adjacent lane L2), the lane change determining unit 80 determines whether or not the host vehicle 12 satisfies the second determination condition. In this case, when the predetermined condition is satisfied without having satisfied the second determination condition (step S6: NO), the lane change determining unit 80 does not permit the lane change, and the process proceeds to step S10.

More specifically, in the case that the amount of remaining fuel is small (when the remaining fuel is less than the threshold value indicated by the second determination condition), then since the exit from the car pool lane 102a is far, and time is required to depart from the exit and reach a refueling station, the lane change determining unit 80 does not permit the lane change. Further, in the case that the general lane 102b is relatively empty, it is possible to travel comfortably in the general lane 102b and there is little necessity to make a lane change into the car pool lane 102a, and therefore, the lane change determining unit 80 does not permit the lane change. Furthermore, if a lane change to the car pool lane 102a is performed in the case that the host vehicle 12 is traveling in a road following manner in the general lane 102b, time is required to make a lane change from the car pool lane 102a into the general lanes 102b to 102d, and there is also assumed to be a possibility that the host vehicle 12 may not be able to depart from the exit as desired by the driver. In such cases, the lane change determining unit 80 unit does not permit the lane change. Further still, in the case that a proficiency level of the driver with respect to automated driving is less than a threshold value, when traveling in the car pool lane 102a and a lane change is made from the car pool lane 102a into the general lane 102b, there is also a possibility that the driver may have trouble in coping with such a lane change. In such a case as well, the lane change determining unit 80 does not permit the lane change. Further, in the case that traffic congestion is occurring in the vicinity of an exit of the road 100, and if the host vehicle 12 is traveling in the car pool lane 102a, there is a possibility that the host vehicle 12 cannot depart from the road 100 through the exit, and therefore, the lane change determining unit 80 does not permit the lane change. Furthermore, in the case that the host vehicle 12 is not a specified vehicle, since it is impossible to make a lane change into the car pool lane 102a, the lane change determining unit 80 does not permit the lane change.

On the other hand, in carrying out the lane change from the general lane 102b into the car pool lane 102a, in the case that the host vehicle 12 satisfies the second determination condition (step S6: YES), the lane change determining unit 80 permits the lane change, and the process proceeds to step S7.

In step S7, the lane change determining unit 80 outputs to the vehicle control unit 68 a result to the effect that the lane change is permitted. Consequently, the notification control unit 84 informs the driver via the notification device 46 that the lane change has been permitted.

In step S8, in the case that an instruction to switch to the "automated driving mode" has been issued from the driving mode switching unit 70 (step S8: YES), the vehicle control unit 68 determines that a start trigger for changing lanes by way of automated driving has been accepted, and the process proceeds to step S9.

In the following step S9 (fourth step), the vehicle control unit 68 performs a travel control or an assist control (hereinafter also referred to as a "lane change control") in relation to the lane change of the host vehicle 12. Prior to such a control, the vehicle control unit 68 acquires the event content and the travel trajectory of the action plan created by the action planning unit 64.

Thereafter, the travel control unit 82 generates control signals for realizing the lane change, and outputs the respective control signals with respect to the driving force output device 40, the steering device 42, and the braking device 44. On the other hand, the notification control unit 84 generates a notification signal indicative of notification content that supports the lane change (for example, a timing instruction for the lane change), and outputs the notification signal to the notification device 46.

Figure 5:
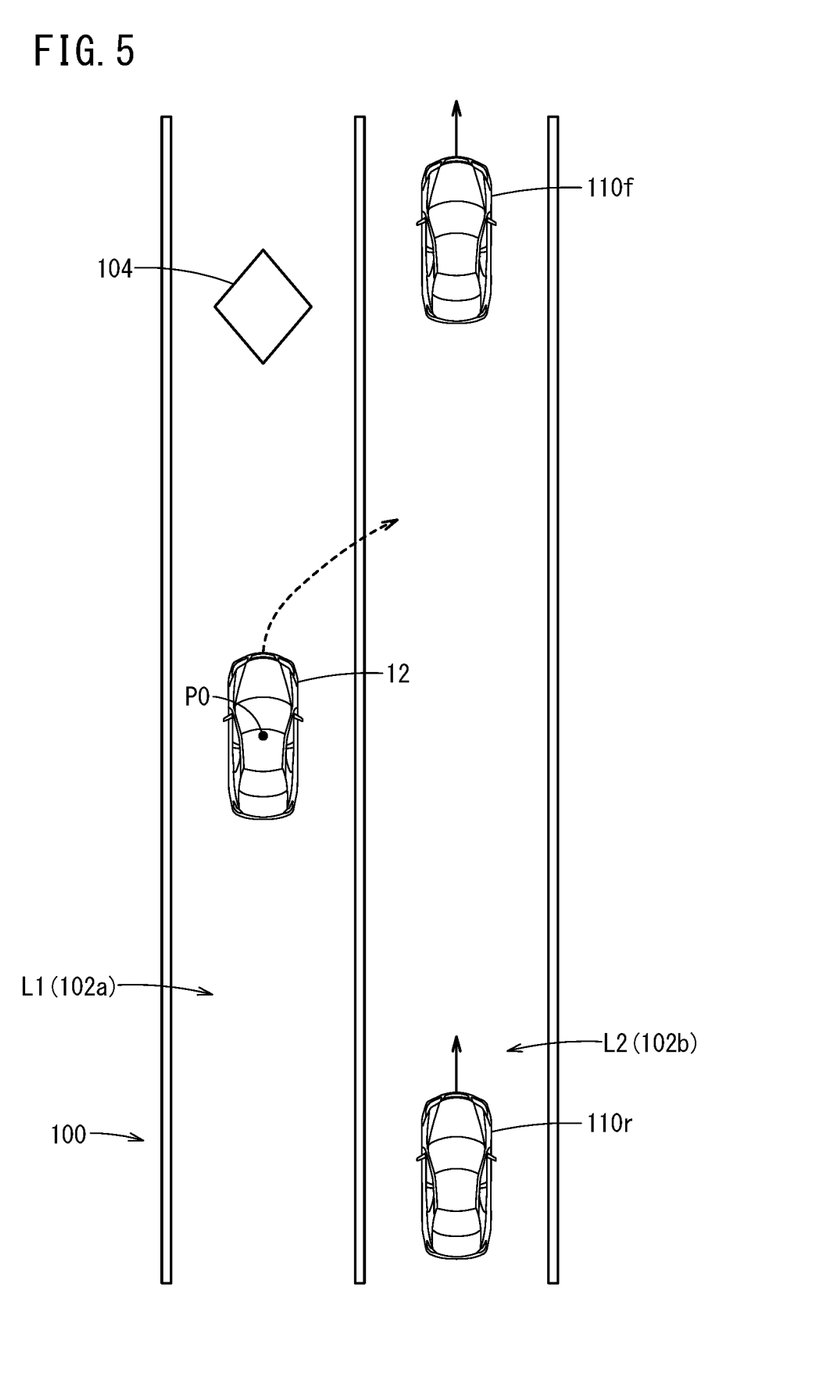
FIG. 5 is a diagram showing a traveling state of a host vehicle that is capable of making a lane change.

Consequently, the host vehicle 12 starts to make the lane change, and following the planned travel route 106 indicated by the dashed line, is capable of making the lane change from the general lane 102b into the car pool lane 102a as shown in FIG. 4, or is capable of making the lane change from the car pool lane 102a (host vehicle lane L1) into the general lane 102b (adjacent lane L2) as shown in FIG. 5. More specifically, in the example shown in FIG. 4, a case is shown in which the process steps are performed sequentially in the order of steps S3→S5→S6→S7→S8→S9 (see FIG. 3). On the other hand, in the example shown in FIG. 5, a case is shown in which the process steps are performed sequentially in the order of steps S3→S4→S6→S7→S8→S9.

Figure 6:
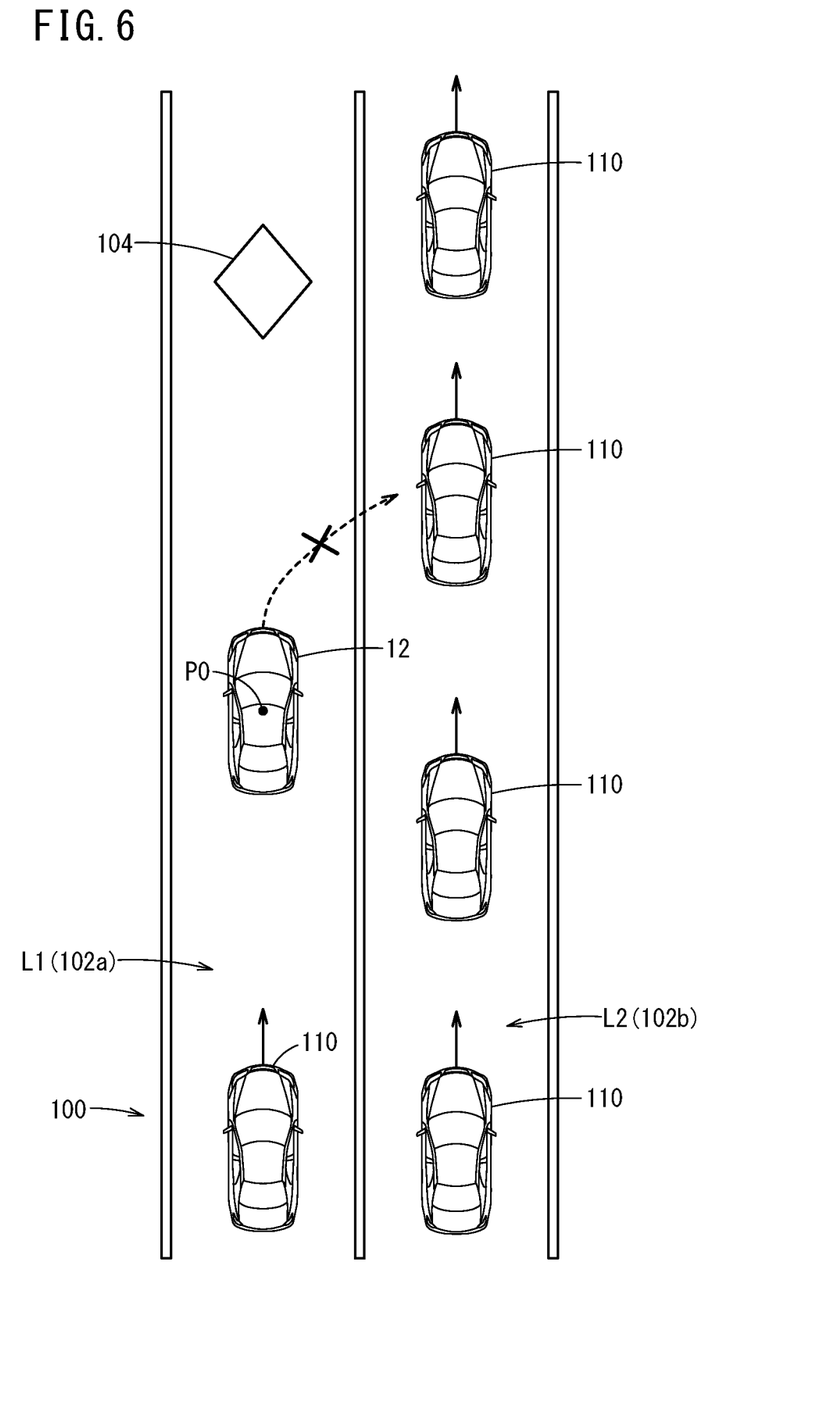
FIG. 6 is a diagram showing a traveling state of a host vehicle in which it is difficult to make a lane change.

Moreover, as shown in FIG. 6, in the case that traffic congestion is occurring in the adjacent lane L2, a determination is made by the determination process of step S6 (see FIG. 3) that the lane change is impossible (step S6: NO). Stated otherwise, the host vehicle 12 continues traveling in the car pool lane 102a which is the host vehicle lane L1. In this case, the process steps are performed sequentially in the order of steps S3→S4→S6→S10.

Further, in step S8, in the case that by the driver operating the input device and performing a takeover request, an instruction to switch to the manual driving mode is input to the vehicle control unit 68 from the driving mode switching unit 70 (see FIG. 2) (step S8: NO), the process proceeds to step S11. In step S11, the driver operates an input device such as the steering wheel, whereby a lane change of the host vehicle 12 is carried out.

In this manner, after a lane change by way of automated driving in step S9, after a lane change by way of a manual operation made by the driver in step S11, or after continuation of traveling in the host vehicle lane L1 due a negative determination in step S6, the process proceeds to step S10. In step S10, the lane change determining unit 80 determines whether or not the host vehicle 12 has passed through the exit and departed from the freeway (road 100). In the case that traveling is still taking place on the road 100 in any one of the lanes 102a to 102d, the lane change determining unit 80 determines that the host vehicle 12 is not departing from the freeway (step S10: NO), and the process returns to step S2.

Consequently, in the vehicle control device 10, the processes of steps S2 to S10 (S11) are repeatedly executed until the host vehicle 12 departs from the freeway via the exit. In this case, with each time that a lane change is made, the setting process of setting the determination condition in steps S3 to S5, and the process of determining whether to permit the lane change in step S6 using the set determination condition are executed. In addition, upon the host vehicle 12 passing through the exit and departing from the freeway (road 100) (step S10: YES), the process of FIG. 3 is brought to an end.

<2.3. Modification of FIG. 3>

In the flowchart of FIG. 3, in the case that the host vehicle 12 continues with automated driving, as indicated by the dashed lines, the process of step S7 or S8 may be skipped.

Further, in step S6, upon comparing a case of the host vehicle 12 traveling in the host vehicle lane L1 (for example, the general lane 102b), and a case of the host vehicle 12 making a lane change and traveling in the adjacent lane L2 (for example, the car pool lane 102a), when it is determined that the host vehicle 12 traveling in the adjacent lane L2 will reach a destination (for example, an exit of the road 100) in a shorter time period, the lane change determining unit 80 may output such a determination result to the notification control unit 84. Consequently, in step S7, via the notification device 46, the notification control unit 84 can notify the driver of a recommendation for traveling in the adjacent lane L2. By confirming the notification content, for example, in step S11, the driver is capable of making a lane change from the host vehicle lane L1 into the adjacent lane L2.

Further, in FIG. 4, only one lane on the left side of the travel direction of the host vehicle 12 is the car pool lane 102a. However, a plurality of lanes on the left side may serve as car pool lanes 102a. In this case, the determination condition setting unit 78 (see FIG. 2) may set the second determination condition in the process flow from steps S3 to S5 in FIG. 3, and in step S6, the lane change determining unit 80 may determine whether or not the lane change is possible on the basis of the second determination condition. Moreover, in the present modification, cases may occur in which the specified vehicle (the host vehicle 12), which is traveling in one from among a plurality of the car pool lanes 102a, makes a lane change into another lane. Therefore, the determination condition setting unit 78 can also set a determination condition (for example, the first determination condition) which is more relaxed (less strict) than the second determination condition.

[3. Effects and Advantages of Vehicle Control Device 10]

As described above, in the vehicle control device 10 and the vehicle control method, a travel control or an assist control for the host vehicle 12 is carried out on the basis of an output result from at least one device from among the periphery monitoring devices (the external environment sensors 18, the communication device 20) that monitor the periphery around the host vehicle 12, or the position specifying devices (the map information DB 22, the navigation device 24) that specify the travel position of the host vehicle 12.

In this case, the vehicle control device 10 comprises the lane recognition unit 72 that recognizes the lane type of the adjacent lane L2 adjacent to the host vehicle lane L1 in which the host vehicle 12 is traveling, the determination condition setting unit 78 that sets the first or second determination condition for permitting the lane change of the host vehicle 12 from the host vehicle lane L1 to the adjacent lane L2 depending on the lane type of the adjacent lane L2 that was recognized by the lane recognition unit 72, the lane change determining unit 80 that permits the lane change in the case that the first or second determination condition is satisfied, and the vehicle control unit 68 that carries out a travel control or an assist control in relation to the lane change, in the case that the lane change determining unit 80 has permitted the lane change.

Further, in the vehicle control method, in steps S2 and S3, the lane recognition unit 72 recognizes the lane type of the adjacent lane L2, in steps S4 and S5, the determination condition setting unit 78 sets the first determination condition or the second determination condition depending on the lane type of the adjacent lane L2 that was recognized, in step S6, the lane change determining unit 80 permits the lane change in the case that the first determination condition or the second determination condition is satisfied, and in step S9, the vehicle control unit 68 carries out the travel control or the assist control in relation to the lane change, in the case that the lane change has been permitted.

In the foregoing manner, even if there is a tendency for the flow of traffic to differ in each of the lanes, the first determination condition or the second determination condition for permitting the lane change is changed depending on the lane type. Consequently, it becomes possible to appropriately determine whether to permit the lane change while taking into consideration the tendency of the flow of traffic, and it is possible for the host vehicle 12 to smoothly perform the lane change. As a result, even in the case that the host vehicle 12 travels on a road 100 such as a freeway having a plurality of lanes, the host vehicle 12 is capable of traveling in a stable manner.

Further, the lane type of the adjacent lane L2 includes the car pool lane 102a as a specified lane in which a specified vehicle is capable of traveling in a preferential manner, or one of the general lanes 102b to 102d in which all vehicles can travel, and the determination condition setting unit 78 may set the first determination condition or the second determination condition in consideration of a state of the host vehicle 12, the periphery monitoring device, the position specifying device, or the state of the vehicle control device 10, the surrounding environment of the host vehicle 12, information concerning the driver of the host vehicle 12, or travel plan information of the host vehicle 12, in a manner so that the first determination condition or the second determination condition differs between a case in which the adjacent lane L2 is the car pool lane 102a and a case in which the adjacent lane L2 is one of the general lanes 102b to 102d. In accordance with this feature, since the first determination condition or the second determination condition is set in accordance with the operational state of the automated driving system and the state of the driver, it is possible to make the determination of permitting the lane change more accurately.

Furthermore, in the case that the adjacent lane L2 is the car pool lane 102a, based on a number of vehicle occupants of the host vehicle 12, a point in time when the lane change is made, or a type of the host vehicle 12, the determination condition setting unit 78 may set the second determination condition which is stricter than the first determination condition that is applied when the adjacent lane L2 is one of the general lanes 102b to 102d. In accordance with this feature, when performing the lane change from the general lane 102b into the car pool lane 102a, it is possible to determine whether to permit the lane change in a more accurate manner.

In this instance, in the case that the adjacent lane L2 is the car pool lane 102a, the lane change determining unit 80 does not permit the lane change when a predetermined condition is satisfied. In this manner, by prohibiting or suppressing the lane change to the car pool lane 102a, it is possible to prevent the host vehicle 12 from inadvertently making a lane change into the car pool lane 102a using AD or ADAS.

In greater detail, the lane change determining unit 80 does not permit the lane change if the following various conditions are satisfied.

More specifically, in the case that the host vehicle lane L1 (one of the general lanes 102b to 102d) is relatively empty, it is possible to travel comfortably in the host vehicle lane L1, and there is little necessity to make a lane change into the car pool lane 102a. In such a case, the lane change determining unit 80 does not permit the lane change.

Further, if a lane change to the car pool lane 102a is performed in the case that the host vehicle 12 is automatically traveling in the host vehicle lane L1 (one of the general lanes 102b to 102d) in a state in which the host vehicle 12 has not set a destination (in the case of traveling in a road following manner), time is required to make the lane change from the car pool lane 102a into the host vehicle lane L1 and the adjacent lane L2, and there is also assumed to be a possibility that the host vehicle 12 may not be able to depart from an exit of the road 100 as desired by the driver. In such a case as well, the lane change determining unit 80 does not permit the lane change.

Furthermore, in the case that a proficiency level of the driver with respect to automated driving is less than a threshold value, and if the host vehicle 12 is traveling in the car pool lane 102a using AD or ADAS, then when a lane change is made from the car pool lane 102a into the host vehicle lane L1 and the adjacent lane L2, there is also assumed to be a possibility that the driver may have trouble in coping with such a lane change. In such a case as well, the lane change determining unit 80 does not permit the lane change.

Still further, in the case that traffic congestion is occurring in the vicinity of the exit of the road 100, and if the host vehicle is traveling in the car pool lane 102a, there is a possibility that the host vehicle 12 may not be capable of departing from the exit. In such a case as well, the lane change determining unit 80 does not permit the lane change.

Further, upon comparing a case of the host vehicle 12 traveling in the host vehicle lane L1, and a case of the host vehicle 12 making a lane change and traveling in the adjacent lane L2, when it is determined that the host vehicle 12 traveling in the adjacent lane L2 will reach a destination in a shorter time period, the lane change determining unit 80 may notify the driver of the determination result through the notification device 46 of the host vehicle 12. In accordance with this feature, it becomes possible for the driver to select whether to remain traveling in the host vehicle lane L1, or to perform a lane change into the adjacent lane L2.

The present invention is not limited to the embodiment described above, and it goes without saying that the present invention can be freely modified within a range that does not depart from the essence and gist of the present invention. Alternatively, the respective configurations may be combined arbitrarily within a range in which no technical inconsistencies occur.

What is claimed is:

1. A vehicle control device adapted to carry out a travel control or an assist control for a host vehicle, on the basis of an output result from at least one device from among a periphery monitoring device that monitors the periphery around the host vehicle, or a position specifying device that specifies a travel position of the host vehicle, the vehicle control device comprising:
    a lane recognition unit adapted to recognize a respective lane type of each lane of a plurality of lanes of a road, the respective lane type being one of a general lane type and a specified lane type in which a specified vehicle is capable of traveling in a preferential manner, the plurality of lanes of the road include a first lane connected to an entrance and an exit of a road and recognized to have the general lane type, one or more second lanes adjacent to the first lane and recognized to have the general lane type, and a specified lane separated from the first lane by the one or more second lanes and recognized to have the specified lane type, wherein a host vehicle lane is one of the plurality of lanes of the road in which a host vehicle is traveling and an adjacent lane is one of the plurality of lanes of the road adjacent to the host vehicle lane;
    a determination condition setting unit adapted to set a determination condition for permitting a lane change of the host vehicle from the host vehicle lane to the adjacent lane depending on the respective lane type of the adjacent lane that was recognized by the lane recognition unit;
    a lane change determining unit adapted to permit the lane change of the host vehicle in the case that the determination condition is satisfied; and
    a vehicle control unit adapted to carry out a travel control or an assist control in relation to the lane change of the host vehicle, in the case that the lane change determining unit has permitted the lane change,
    in a case where the adjacent lane is the first lane or the one or more second lanes, the determination condition setting unit sets a first determination condition,
    in a case where the adjacent lane is the specified lane, the determination condition setting unit sets a second determination condition that is stricter than the first determination condition.

2. The vehicle control device according to claim 1, wherein:
    the determination condition setting unit sets a determination condition in consideration of a state of the host vehicle, a state of the periphery monitoring device, a state of the position specifying device, a state of the vehicle control device, the surrounding environment of the host vehicle, information concerning the driver of the host vehicle, or travel plan information of the host vehicle, in a manner so that the determination condition differs between the first determination condition and the second determination condition.

3. The vehicle control device according to claim 2, wherein, in the case that the adjacent lane is the specified lane, the determination condition setting unit sets the second determination condition based on at least one of a number of vehicle occupants of the host vehicle, a point in time when the lane change is made, and a type of the host vehicle.

4. The vehicle control device according to claim 3, wherein, in the case that the adjacent lane is the specified lane, the lane change determining unit does not permit the lane change when a predetermined condition is satisfied.

5. The vehicle control device according to claim 4, wherein the lane change determining unit does not permit the lane change in the case that the host vehicle lane is relatively empty.

6. The vehicle control device according to claim 4, wherein the lane change determining unit does not permit the lane change in the case that the host vehicle is traveling in a road following manner along the host vehicle lane.

7. The vehicle control device according to claim 4, wherein the lane change determining unit does not permit the lane change in the case that a proficiency level of the driver with respect to the travel control or the assist control is less than a threshold value.

8. The vehicle control device according to claim 4, wherein the lane change determining unit does not permit the lane change in the case that traffic congestion is occurring in the vicinity of the exit.

9. The vehicle control device according to claim 3, wherein, upon comparing a case of the host vehicle traveling in the host vehicle lane, and a case of the host vehicle making a lane change and traveling in the adjacent lane, when it is determined that the host vehicle traveling in the adjacent lane will reach a destination in a shorter time period, the lane change determining unit notifies the driver of the determination result through the notification device of the host vehicle.

10. A vehicle control method adapted to carry out a travel control or an assist control for a host vehicle, on the basis of an output result from at least one device from among a periphery monitoring device that monitors the periphery around the host vehicle, or a position specifying device that specifies a travel position of the host vehicle, the vehicle control method comprising:
    a first step in which a lane recognition unit recognizes a respective lane type of each lane of a plurality of lanes of a road, the respective lane type being one of a general lane type and a specified lane type in which a specified vehicle is capable of traveling in a preferential manner, the plurality of lanes of the road include a first lane connected to an entrance and an exit of a road and recognized to have the general lane type, one or more second lanes adjacent to the first lane and recognized to have the general lane type, and a specified lane separated from the first lane by the one or more second lanes and recognized to have the specified lane type, wherein a host vehicle lane is one of the plurality of lanes of the road in which a host vehicle is traveling and an adjacent lane is one of the plurality of lanes of the road adjacent to the host vehicle lane;

a second step in which a determination condition setting unit sets a determination condition for permitting a lane change of the host vehicle from the host vehicle lane to the adjacent lane depending on the respective lane type of the adjacent lane that was recognized by the lane recognition unit, wherein in a case where the adjacent lane is the first lane or the one or more second lanes, the determination condition setting unit sets a first determination condition, and in a case where the adjacent lane is the specified lane, the determination condition setting unit sets a second determination condition that is stricter than the first determination condition;

a third step in which a lane change determining unit permits the lane change of the host vehicle in the case that the determination condition is satisfied; and a fourth step in which a vehicle control unit carries out a travel control or an assist control in relation to the lane change of the host vehicle, in the case that the lane change determining unit has permitted the lane change.

11. The vehicle control device according to claim 1, wherein the determination condition setting unit sets the second determination condition in which condition items subjected to processing for permitting the lane change of the host vehicle are increased from the first determination condition.

12. The vehicle control device according to claim 1, wherein the determination condition setting unit sets different threshold values with respect to a same condition item in the first determination condition and the second determination condition.

* * * * *